United States Patent
Marchand (10) Patent No.: US 7,707,457 B2
(45) Date of Patent: *Apr. 27, 2010

(54) COMPLETING AN INTERRUPTED DATA REPLICATION OPERATION

(75) Inventor: Benoit Marchand, Montreal (CA)

(73) Assignee: eXludus Technologies, Inc., Quebec (CA)

( * ) Notice: Subject to any disclaimer, the term of this patent is extended or adjusted under 35 U.S.C. 154(b) by 262 days.

This patent is subject to a terminal disclaimer.

(21) Appl. No.: 11/926,064

(22) Filed: Oct. 28, 2007

(65) Prior Publication Data

US 2008/0168157 A1 Jul. 10, 2008

Related U.S. Application Data

(63) Continuation of application No. 10/445,145, filed on May 23, 2003, now Pat. No. 7,305,585.

(30) Foreign Application Priority Data

May 23, 2002 (EP) .................. 02011310

(51) Int. Cl.
G06F 11/00 (2006.01)

(52) U.S. Cl. .................................. 714/18

(58) Field of Classification Search ........... 714/18, 714/20
See application file for complete search history.

(56) References Cited

U.S. PATENT DOCUMENTS

| | | | |
|---|---|---|---|
| 3,905,023 A | 9/1975 | Perpiglia | |
| 4,130,865 A | 12/1978 | Heart et al. | |
| 4,228,496 A | 10/1980 | Katzman et al. | |
| 4,412,281 A | 10/1983 | Works | |
| 4,569,015 A | 2/1986 | Dolev et al. | |
| 4,644,542 A | 2/1987 | Aghili et al. | |
| 4,718,002 A | 1/1988 | Carr | |
| 5,459,725 A | 10/1995 | Bodner et al. | |
| 5,764,875 A | 6/1998 | Badovinatz et al. | |
| 5,845,077 A | 12/1998 | Fawcett | |
| 5,905,871 A | 5/1999 | Buskens et al. | |
| 5,933,647 A | 8/1999 | Aronberg et al. | |

(Continued)

OTHER PUBLICATIONS

S. Deering, "Host Extensions for IP Multicasting," Network Working Group, Request for Comments: 1112, Stanford University, Aug. 1989.

(Continued)

Primary Examiner—Robert Beausoliel
Assistant Examiner—Elmira Mehrmanesh
(74) Attorney, Agent, or Firm—Carr & Ferrell LLP (57) ABSTRACT

Apparatus and method to improve the speed, scalability, robustness and dynamism of multicast data transfers to remote computers. Many Grid Computing applications, such as Genomics, Proteomics, Seismic, Risk Management, etc., require a priori transfer of sets of files or other data to remote computers prior to processing taking place. Existing multicast and data transfer protocols are static and can not guarantee that all nodes will contain a copy of the replicated data or files. The fully distributed data transfer and data replication protocol of the invention permits transfers which minimize processing requirements on master transfer nodes by spreading work across the network. The result is higher scalability than current centralized protocols, more dynamism and allows fault-tolerance by distribution of functionality. The ability to distribute the protocol is simplified through our innovative symmetric-connectionless data transfer protocol.

19 Claims, 11 Drawing Sheets

U.S. PATENT DOCUMENTS

| | | | |
|---|---|---|---|
| 5,944,779 | A | 8/1999 | Blum |
| 6,031,818 | A | 2/2000 | Lo et al. |
| 6,073,214 | A | 6/2000 | Fawcett |
| 6,112,323 | A | 8/2000 | Meizlik et al. |
| 6,247,059 | B1 | 6/2001 | Johnson et al. |
| 6,256,673 | B1 | 7/2001 | Gayman |
| 6,278,716 | B1 | 8/2001 | Rubenstein et al. |
| 6,279,029 | B1 | 8/2001 | Sampat et al. |
| 6,327,617 | B1 | 12/2001 | Fawcett |
| 6,351,467 | B1 | 2/2002 | Dillon |
| 6,370,565 | B1 | 4/2002 | Van Gong |
| 6,415,312 | B1 | 7/2002 | Boivie |
| 6,418,554 | B1 | 7/2002 | Delo et al. |
| 6,446,086 | B1 | 9/2002 | Bartlett et al. |
| 6,501,763 | B1 | 12/2002 | Bhagavath et al. |
| 6,505,253 | B1 | 1/2003 | Chiu et al. |
| 6,522,650 | B1 | 2/2003 | Yonge, III et al. |
| 6,557,111 | B1 | 4/2003 | Theimer et al. |
| 6,567,929 | B1 | 5/2003 | Bhagavath et al. |
| 6,640,244 | B1 | 10/2003 | Bowman-Amuah |
| 6,662,363 | B1 | 12/2003 | Miyamoto |
| 6,704,842 | B1 | 3/2004 | Janakiraman et al. |
| 6,753,857 | B1 | 6/2004 | Matsuura et al. |
| 6,801,949 | B1 | 10/2004 | Bruck et al. |
| 6,816,897 | B2 | 11/2004 | McGuire |
| 6,952,741 | B1 | 10/2005 | Bartlett et al. |
| 6,957,186 | B1 | 10/2005 | Guheen et al. |
| 6,965,938 | B1 | 11/2005 | Beasley et al. |
| 6,987,741 | B2 | 1/2006 | Kelly et al. |
| 6,990,513 | B2 | 1/2006 | Belfiore et al. |
| 7,058,601 | B1 | 6/2006 | Paiz |
| 7,062,556 | B1 | 6/2006 | Chen et al. |
| 7,181,539 | B1 | 2/2007 | Knight et al. |
| 7,340,532 | B2 | 3/2008 | Swildens |
| 7,418,522 | B2 | 8/2008 | Berg |
| 7,421,505 | B2 | 9/2008 | Berg |
| 2002/0016956 | A1 | 2/2002 | Fawcett |
| 2002/0161890 | A1 | 10/2002 | Chen |
| 2003/0145317 | A1 | 7/2003 | Chamberlain |
| 2003/0182358 | A1 | 9/2003 | Rowley et al. |
| 2003/0221190 | A1 | 11/2003 | Deshpande et al. |
| 2004/0030787 | A1 | 2/2004 | Jandel et al. |
| 2007/0168478 | A1 | 7/2007 | Crosbie |
| 2008/0201414 | A1 | 8/2008 | Amir Husain et al. |

OTHER PUBLICATIONS

K. Birman, "A Response to Cheriton and Skeen's Criticism of Casual and Totally Ordered Communication," Depart. of Computer Science, Cornell University, Ithaca, NY, Oct. 1993.

V. Jacobson, "Lightweight Sessions—A New Architecture for Realtime Applications and Protocols," Networkshop '93, Melbourne, Australia, Nov. 30, 1993.

V. Jacobson, "A Privacy Architecture for Lightweight Sessions," ARPA Network PI Meeting, Santa Fe, New Mexico, Sep. 26-28, 1994.

S. Floyd, "A Reliable Multicast Framework for Light-weight Sessions and Application Level Framing," Ext. Ver. of Paper Sub. to IEEE/ACM Trans. on Networking, Nov. 13, 1995.

D. Towsley et al., "A Comparison of Sender-Initiated and Receiver-Initiated Reliable Multicast Protocols," IEEE Journal on Selected Area Comm., vol. 15, No. 3, Apr. 1997.

C. Liu, "Local Error Recovery in SRM: Comparison of Two Approaches," IEEE/ACM Transactions on Networking (1997).

S. Floyd, "A Reliable Multicast Framework for Light-Weight Sessions and Application Level Framing," Paper to Appear in IEEE/ACM Transactions on Networking, Dec. 1997.

S. Floyd, "A Reliable Multicast Framework for Light-Weight Sessions and Application Level Framing," IEEE/ACM Transactions on Networking, vol. 5, No. 6, Dec. 1997.

S. Shi, "Reliable Multicast," Apr. 7, 1999.

S. Kasera, "Scalable Reliable Multicast in Wide Area Networks," Department of Computer Science, University of Massachusetts, Sep. 1999.

S. Kasera, "Scalable Fair Reliable Multicast Using Active Services," IEEE Network, Jan./Feb. 2000.

T. Fuhrmann, "On the Scaling of Feedback Algorithms for Very Large Multicast Groups," University of Mannheim, Germany, Feb. 1, 2000.

R. Fang, "Forward Error Correction for Multimedia and Teleimmersion Data Streams," EVL Internal Technical Report, Feb. 1, 2000.

S. Elf, "A Literature Review of Recent Developments in Reliable Multicast Error Handling," Lulea University of Technology, Jan. 2001.

D. Magoni, "Oriented Multicast Routing Algorithm Applied to Network-Level Agent Search," Discrete Mathematics and Theoretical Computer Science 4, 2001.

M. Howarth, "Error Performance Aspects of IP Multicast Over Satellite," University of Surrey, School of Electronics, Computing and Mathematics, Aug. 2001.

Kasera, Sneha K. et al, "A Comparison of Server-Based and Receiver-Based Local Recovery Approaches for Scalable Reliable Multicast," Infocom '98, 17th Annual Joint Conference.

Bauer, Daniel et al., "An Error-Control Scheme for a Multicast Protocol Based on Round-Trip Time Calculations," Proceedings of the 21st IEEE Conference on Local Computer Netwo.

Figure 1: Symmetric-Connectionless File Transfer Protocol Primitive

Figure 2: Broadcast/Multicast File Transfer Process Layout

Figure 3: Transfer Error Recovery and File Replication Process Layout

Figure 4: User Interface Process Protocol Finite State Machine

Figure 5: File Transfer Master Process Protocol Finite State Machine

Figure 6: File Transfer Slave Process Protocol Finite State Machine

Figure 7: Multicast/Broadcast Master Process Protocol Finite State Machine

Figure 8: Forwarder Slave Process Protocol Finite State Machine

Figure 9: Transfer Error Recovery Slave Process Protocol Finite State Machine

Figure 10: File Replication Slave Process Protocol Finite State Machine

Figure 11: Distributed Selection Mechanism

COMPLETING AN INTERRUPTED DATA REPLICATION OPERATION

CROSS-REFERENCE TO RELATED APPLICATIONS

This application is a continuation and claims the priority benefit of U.S. patent application Ser. No. 10/445,145 filed May 23, 2003 now U.S. Pat. No. 7,305,585 and entitled "ASYNCHRONOUS AND AUTONOMOUS DATA REPLICATION," which claims the priority benefit of European Patent Application number 02011310.6 filed May 23, 2002. The disclosure of each of the aforementioned applications is incorporated by reference.

BACKGROUND

1. Field of the Invention

The present invention relates to transferring and replicating data among geographically separated computing devices, and, in particular, to implementing a multicast file transfer protocol to transfer files more rapidly, robustly and to more computing devices than current methods permit. In addition, the invention can be used to asynchronously maintain a set of replicated files throughout computer failures and introduction of new computers into the network.

2. Description of the Related Art

Grid Computers, Computer Farms and similar Computer Clusters are being used to deploy a novel type of parallel applications based on concurrent independent tasks related only by their individual contribution to a global problem's resolution. Until now all parallel applications were based on splitting a single task into a multitude of collaborating sub-tasks (i.e. OpenMP, PVM, MPI, etc). However, in some application areas users have recently started to split single large problems into a multitude of sub problems which can be resolved independently of one another. This methodology allows higher scalability and permits the use of Grid Computing techniques and the use of cost efficient computing solutions (i.e. clusters), but requires that the necessary data files first be replicated to the remote nodes prior to the computation taking place. It is this problem of replicated data transfers that our invention addresses.

Existing art to address data file transfer falls into three categories.

First, tasks can make use of on-demand file transfer apparatus, better known as file servers. For problems where file access is minimal, this type of solution works as long as the cluster size (i.e. number of remote computers) is limited to a few hundred. For large and frequent file accesses, this solution does not scale beyond a handful of nodes. Moreover, if entire data files are accessed by all nodes, the total amount of data transfer will be N times that of a single file transfer (where N is the number of nodes). This waste of network bandwidth limits scalability and penalizes computational performance as the nodes are blocked waiting for remote data.

Second, users or tasks can manually transfer files prior to execution though a point-to-point file transfer protocol. There are three types of point-to-point protocols. Standard file transfer protocols (i.e. ftp, tftp) where one file is transferred to one remote node, one packet at a time. Sliding window file transfer protocols, such as the "parallel file transfer protocol" from Donald J. Fabozzi II where multiple packets transit concurrently on their way to a single remote node. And parallel file transfer protocols (ex HPSS PFTP) where multiple point-to-point file transfers operate concurrently. While these methods improve network bandwidth utilization over demand based schemes, the final result is the same: a file is transferred "N" times over the network when replicating information unto "N" remote computers. Moreover, additional file transfers must continually be initiated to cope with the constantly varying nature of large computer networks (i.e. new nodes being added to increase a cluster or Grid size or to replace failed or obsolete nodes).

Third, users or tasks can manually transfer file prior to execution through a multicast (or broadcast) file transfer protocol (ex StarBurst SMFTP). In this scheme each file fragment sent over the network is simultaneously read by all participating remote computers. Hence network bandwidth usage is limited to the same amount of data traffic as for a single point-to-point file transfer. This is currently the most frequent scheme used to resolve problems having been split into multiple concurrent independent tasks as described above. However, this form of apparatus is imperfect. For instance, error recovery is concurrent to the multicast phase. This imposes an increased workload on the master file server node and eventually will limit scalablity. These schemes also are based on the notion of node registration, where prior to the multicast phase, all active and participating remote computers must register to participate in a transfer request. Hence, new nodes being booted during or after the multicast transfer phase will not be participating in the effort to replicate files. Another drawback is that registered computers which crash during the multicast phase cannot join back the transfer group after reboot. Finally, these schemes cannot survive through a crash on the master file server (i.e. the computer which performs the multicast file transfer). These sum of these limitations is that current multicast file transfer art work fail at their task of insuring correct file replication among all participating remote computers in a normal setup of dynamic and error prone network of computers. They lack the fault-tolerance, ability to handle dynamic registration, scalability to tens of thousands of nodes and capability to persist with the file replication effort once the master transfer process terminates.

SUMMARY OF THE INVENTION

The object of the present invention is to implement a multicast data transfer apparatus which keeps operating through computer failures, allows data replication scalability to very large size networks, and, which persists transferring data to newly introduced nodes even after the master data transfer process has terminated.

The terms "computer" and "node" used in the description of the present invention must be understood in the broadest sense, as they can include any computing device or any electronic appliance including a computing device, such as for example a personal computer, a cellular phone, a PDA, etc., which is or can be connected to any one type of network.

The term data transfer used in the description of the present invention must be understood in the broadest sense, as it can include full and partial data transfers. That is, it relates to transfers where an entire data entity (e.g. file) is transferred at once, as well as situations where selected segments of a data entity are transferred at some point. An example of the latter case is a data entity being transferred in its entirety and at a later time, selected segments of the data entity are being updated.

Briefly stated, the present invention ensures the correct replication of sets of files or any other data, for instance in a network of computers, in spite of network failures, computer crashes, or the introduction of new computers in the network.

The present invention innovates in the following areas:

1. symmetric-connectionless data transfer protocol allowing stateless data transfers (i.e. no need for a centralized master data transfer engine to maintain individual state information about participating nodes);

2. separation of the multicast data transfer phase and the point-to-point error recovery phase performed by two independent protocol engines;

3. distributed data transfer protocol where all participating remote computers can collaborate in the error recovery and data replication phases;

4. use of the recovery phase protocol to enable crashed computers to complete data transfers upon reboot;

5. use of the recovery phase protocol to enable newly introduced nodes to perform asynchronously recent data transfers having occurred before they became operational (i.e. data replication);

6. automatic removal of replicated data once they reach their pre-set life span;

7. fault-tolerance of the master data transfer process;

8. dynamically adaptable peer process selection mechanism through a random number and modulus calculation scheme;

9. full and partial (i.e. segments of files) data transfers are supported through the same apparatus.

The apparatus and method according to the invention improve the speed, scalability, robustness and dynamism of multicast data transfers to remote computers. Many Grid Computing applications, such as Genomics, Proteomics, Seismic, Risk Management, etc, require a priori transfer of sets of files or other data to remote computers prior to processing taking place. Existing multicast and data transfer protocols are static and can not guarantee that all nodes will contain a copy of the replicated data or files. The fully distributed data transfer and data replication protocol of the invention permits transfers which minimize processing requirements on master transfer nodes by spreading work across the network. The result is higher scalability than current centralized protocols, more dynamism and allows fault-tolerance by distribution of functionality. The ability to distribute the protocol is simplified through our innovative symmetric-connectionless data transfer protocol.

In particular, the present invention is preferably embodied by a method to using a file transfer protocol to transfer, without regards to a user's privilege, files between remote computers, comprising:

1. segmenting a file into a number of data packets to be multicast (or broadcasted) over a network of computers;

2. recording in a log at each receiving computer the segments of the transferred file already received and those still missing;

3. rebuilding the transferred file by writing received data packets at their original respective location in the file using direct access IO;

4. transmitting by a multicast, or broadcast, apparatus said packets over a network of computers;

5. recovering of missing, incomplete or corrupted data packets by means of a distributed transfer recovery apparatus independent from the transfer apparatus used initially to multicast the data packets;

6. completing of interrupted file transfers by cause of node failure upon reboot by means the recovery apparatus;

7. pursuing file transfers in spite of root transfer node failure by the automatic selection of an alternate multicast root transfer node;

8. synchronizing replicated files upon reboot, or the addition in the network, of a node by means of the recovery apparatus;

9. removing partially transferred files on the remote nodes upon canceling or aborting the file transfer request by the user, an operator or a system crash of the requesting node;

10. determining the number of operational nodes which are in the process of completing an in-progress file transfer or have already completed a file transfer;

11. removing automatically replicated files which have exceeded their preset life-span;

12. selecting peer processes (transfer master selection, transfer error recovery and file replication) through a dynamically adaptable random number and modulus calculation scheme.

DETAILED DESCRIPTION OF THE INVENTION

Figure 1:
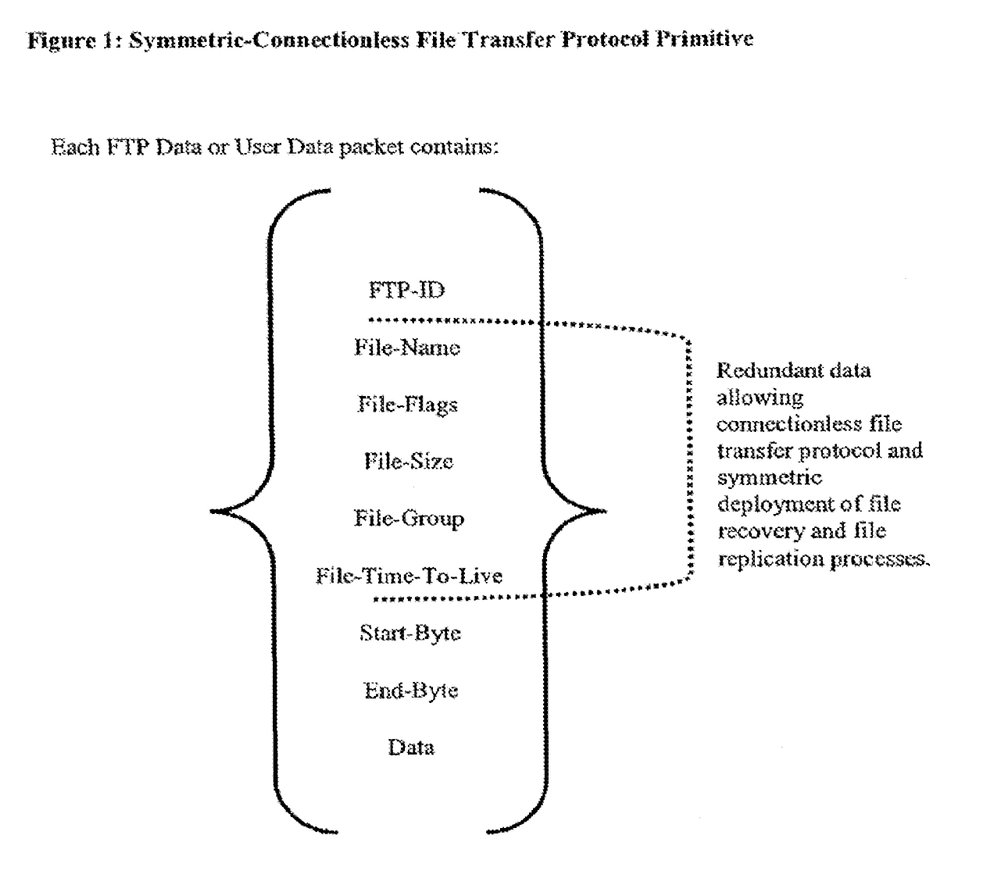
FIG. 1 illustrates the symmetric-connectionless file transfer protocol primitive.

FIG. 1 summarizes the protocol primitive used to implement the symmetric-connectionless file transfer protocol. This protocol primitive is said to be connectionless (i.e. redundant) because it contains all information required to perform a file transfer in every data packet exchange. Indeed file name, file flags, life span, file size, etc are duplicated in each data packet. This information redundancy consumes less than 5% of packet space (Ethernet MTU of 1500 bytes), but allows remote computers to easily "jump in" to any file transfer multicast phase without prior registration phase. Moreover, it allows simple and efficient error recovery and file synchronization for newly introduced nodes and out-of-order processing of data packets. The data transfer primitive is further said to be symmetric because it can be used by the master file transfer process (during the multicast transfer phase) or by any other participating nodes (for error recovery or file replication purposes).

Figure 2:
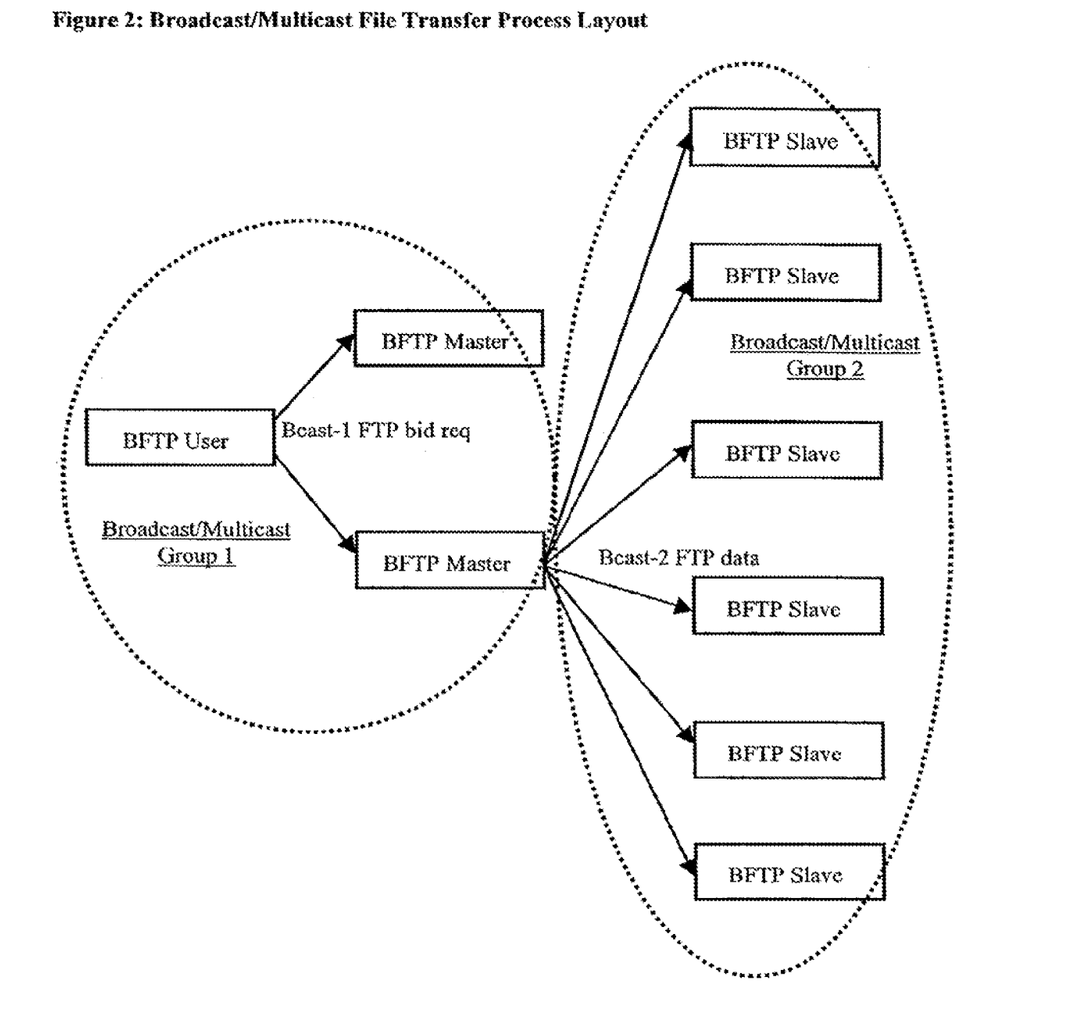
FIG. 2 illustrates the layout of the broadcast/multicast file transfer process.

FIG. 2 shows the different processes layout to complete a multicast file transfer. A user interface process is launched by a user or automated tool to reach all active file transfer master processes and initiate the multicast file transfer. The scope of interaction between these two process types is defined by the geographic coverage of the first multicast/broadcast group. One file transfer master process is selected to proceed to the actual multicast to all active file transfer slave processes reachable by in the second multicast/broadcast group.

Figure 3:
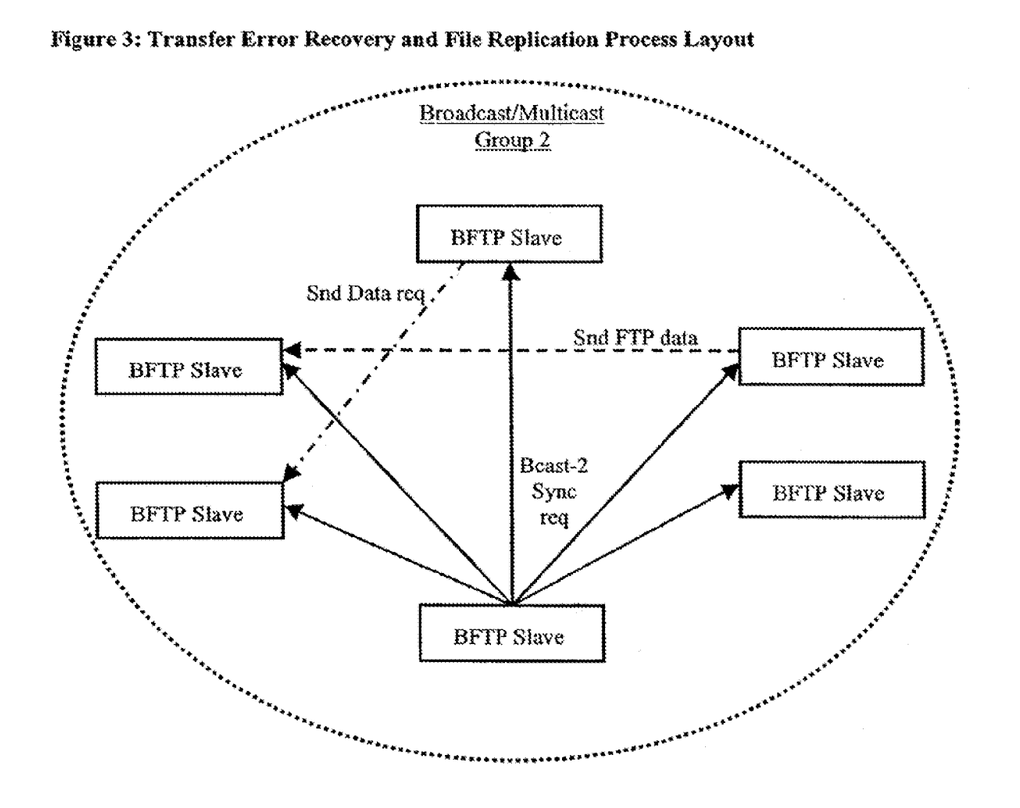
FIG. 3 depicts the layout of the transfer error recovery and file replication process.

FIG. 3 depicts the types of peer-to-peer (i.e. symmetric) exchanges among file transfer slave processes during a file transfer error recovery phase or a file replication phase. The geographic scope is delimited by the second multicast/broadcast group coverage.

FIGS. 4 through 10 show the finite state machines used to implement the multicast/broadcast file transfer and file replication protocols for the user interface, file transfer master and file transfer slave processes and their related sub-processes. The mode of operation can allow multiple concurrent multicast/broadcast file transfers and overlapping of multicast/broadcast file transfer, transfer error recovery and file replication phases. Fault-tolerance, scalability and dynamism are achieved through real-time peer selection and communication persistence.

Referring to FIG. 1, all preceding File Transfer Protocol art is based on the notion of client-server connections or registrations. This requirement prevents dynamic client participation in file transfer activities. It further enforces strict delivery packet ordering. Finally, it necessitates a complex reconnection mechanism. Our file transfer protocol is, by opposition, based on a connectionless model where, without any preceding protocol exchange, file fragments can be exchanged among cooperating processes. Hence at the receiving end processes can jump into any ongoing file transfer exchange at any moment in time, and count on the transfer error recovery protocol to retrieve earlier packets, or missing packets alike. Furthermore, by splitting multicast transfer and recovery transfer phases, connectionless data exchanges allow any cooperating process to participate in error recovery and file replication, thus the symmetric nature of our apparatus. Symmetry also inherently implies higher scalability, since any number of processes may contribute to the recovery phase (the bottleneck of preceding point-to-point recovery arts), and fault-tolerance. Finally, a symmetric protocol allows asynchronous activities, past the normal termination of the multicast file transfer phase. This feature allows the implementation of a file replication mechanism where newly added or rebooted nodes may contact cooperating processes to synchronize with past file transfer activities.

FIG. 2 represents the interconnection of processes in our apparatus. There are three process level components: the user interface, the file transfer master and the file transfer slave processes.

The user interface is mandated with establishing, and maintaining established, a link with any one of the active file transfer masters and sending the file fragments. The link is established by multicasting (or broadcasting) a request on a predefined communication port (socket port number) and selecting one of the active file transfer master. The presence of multiple file transfer masters and our communication protocol allows fault-tolerance, that is, the multicast file transfer will continue through file transfer master processes failures as long as there is still at least one active file transfer master. Moreover redundant file transfer master allows for concurrent multicast file transfers. A serialization or token mechanism may be added to prevent network saturation by limiting the number of simultaneous file transfers.

Once a file transfer master is selected to perform the multicast file transfer, it forks a child process to take over the multicast (or broadcast) transfer phase, allowing a single file transfer master to handle multiple transfer requests simultaneously. The child process then forwards all file fragments over the network to pre-determined communication port for the benefit of all participating file transfer slave processes. Active file transfer slaves pick up the file fragments from the network and write them at their appropriate location in the target replicated file.

FIG. 3 shows the sort of activities, among file transfer slave processes, which may persist after the multicast transfer phase has terminated. For instance, cooperating file transfer slaves may assist each other in an error recovery phase, forwarding file fragments to other slaves having missed some file fragments or received corrupted file fragments. A simple extension of this error recovery protocol allows for newly introduced nodes, running a file transfer slave, to catch up on earlier file transfers and (re)build their set of locally replicated files.

Figure 11:
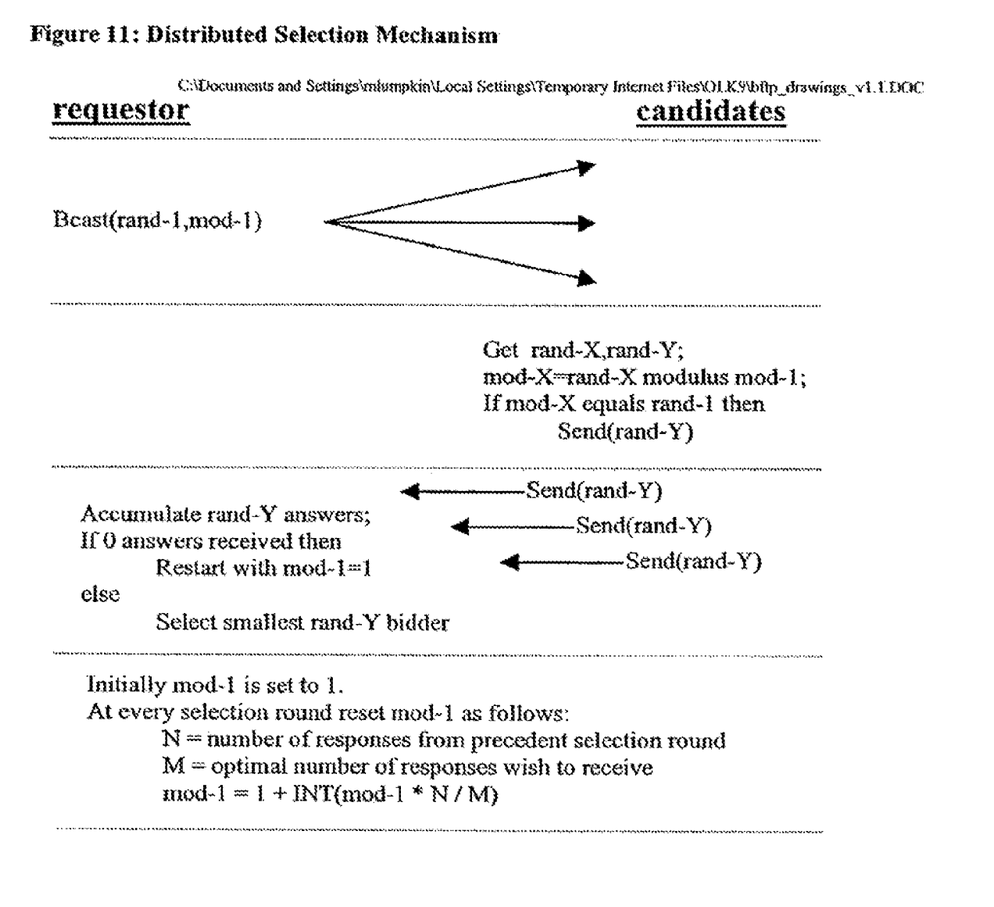
FIG. 11 shows the distributed selection mechanism.

The selection mechanism, FIG. 11, used by a user interface process to elect a file transfer master or by a file transfer slave process to choose another file transfer slave process to perform file replication or error recovery is based on a novel random number and modulus calculation scheme. Prior distributed computing methods to perform election are based on N×N message exchanges. This N×N problem resolution creates network communication bottlenecks in large networks with many elections to process and physically prevents scaling to tens of thousands of nodes. Moreover it requires an a priori knowledge of the network topology and number of participants. In our scheme, a partner selection, among a large set of cooperating candidates, is performed by performing a multicast (or broadcast) of a random number and a modulus number. Upon reception, likely candidates calculate two new random numbers. The first random number is applied the received modulus number and if the result matches the received random number, the second generated random number is sent back. The election originator accumulates returned answers for a limited amount of time and selects the candidate with the smaller returning random number. This scheme is made adaptative by varying the modulus number in order to reduce or increase the number of respondents. The modulus number to use for a new election round is based on the number or respondents from past requests, and initially is set to "1" (forces everybody to respond).

Figure 4:
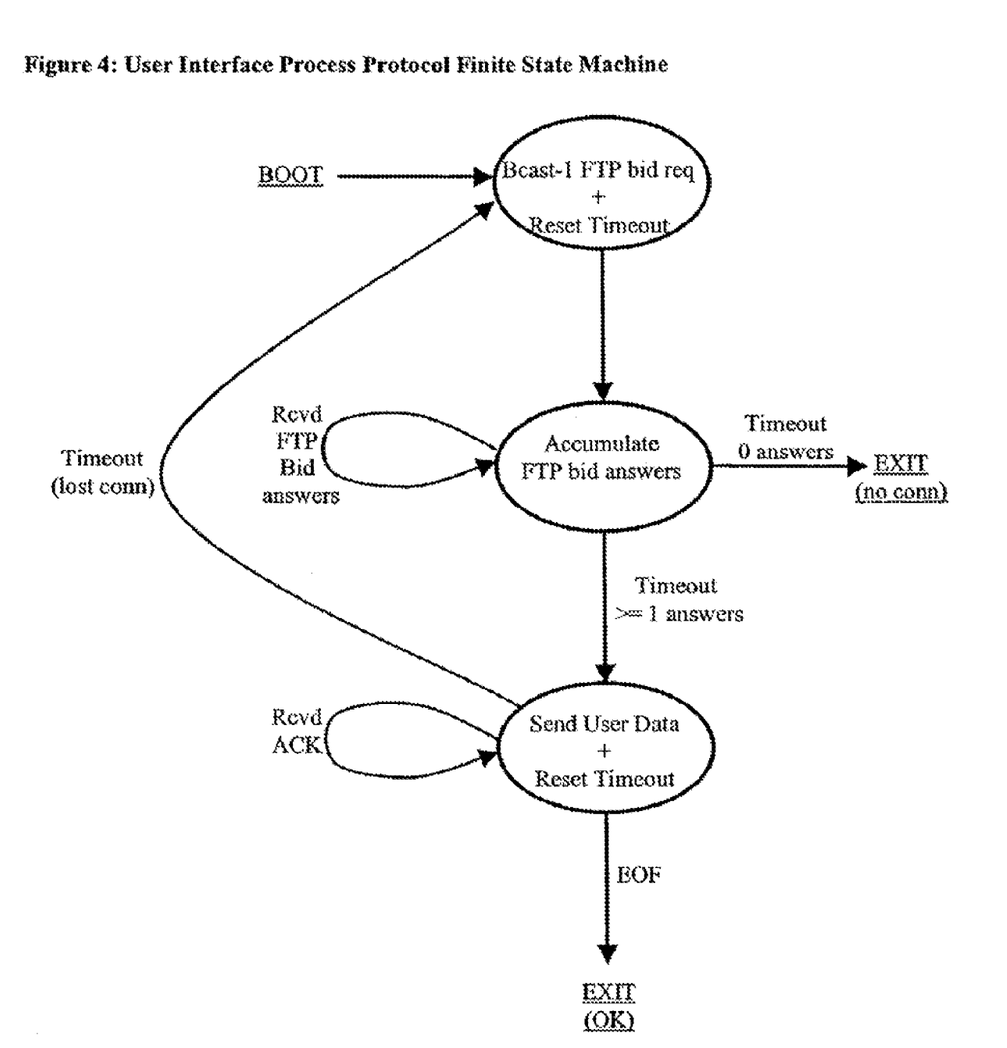
FIG. 4 shows the user interface process protocol finite state machine.

FIG. 4 depicts the user interface process protocol finite state machine. The initial step is to select a file transfer master process to send file fragments to. This phase fails if no file transfer master processes are reachable. The transfer of file fragments begins and proceeds until all fragments have been transferred. Should the selected file transfer master process stop responding, a new election round is initiated and transfer may proceed from where it was interrupted.

Figure 5:
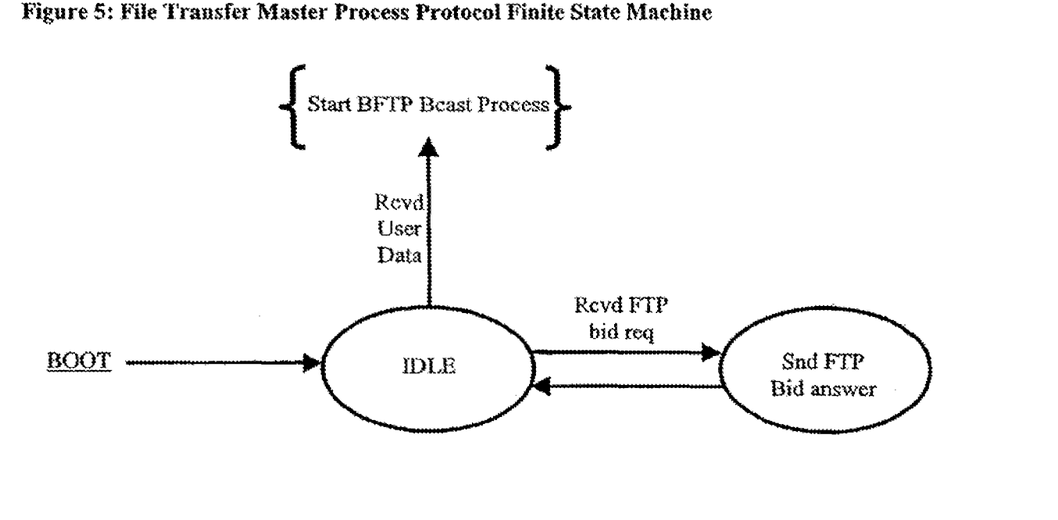
FIG. 5 shows the file transfer master process protocol finite state machine.

The file transfer master process protocol finite state machine, FIG. 5, is quite minimal; it replies to selection requests and, once selected, spawns a child process to conduct the actual multicast (or broadcast) file transfer phase. The multicast (or broadcast) file transfer process protocol finite stale machine (FIG. 7) consists in forwarding all file fragments received from the user interface process to all participating file transfer slave processes. Should the user interface process stop responding, the multicast file transfer process notifies all file transfer slave processes and terminates. The protocol may be extended to perform a file transfer completion check with all remote file transfer slave processes.

Figure 6:
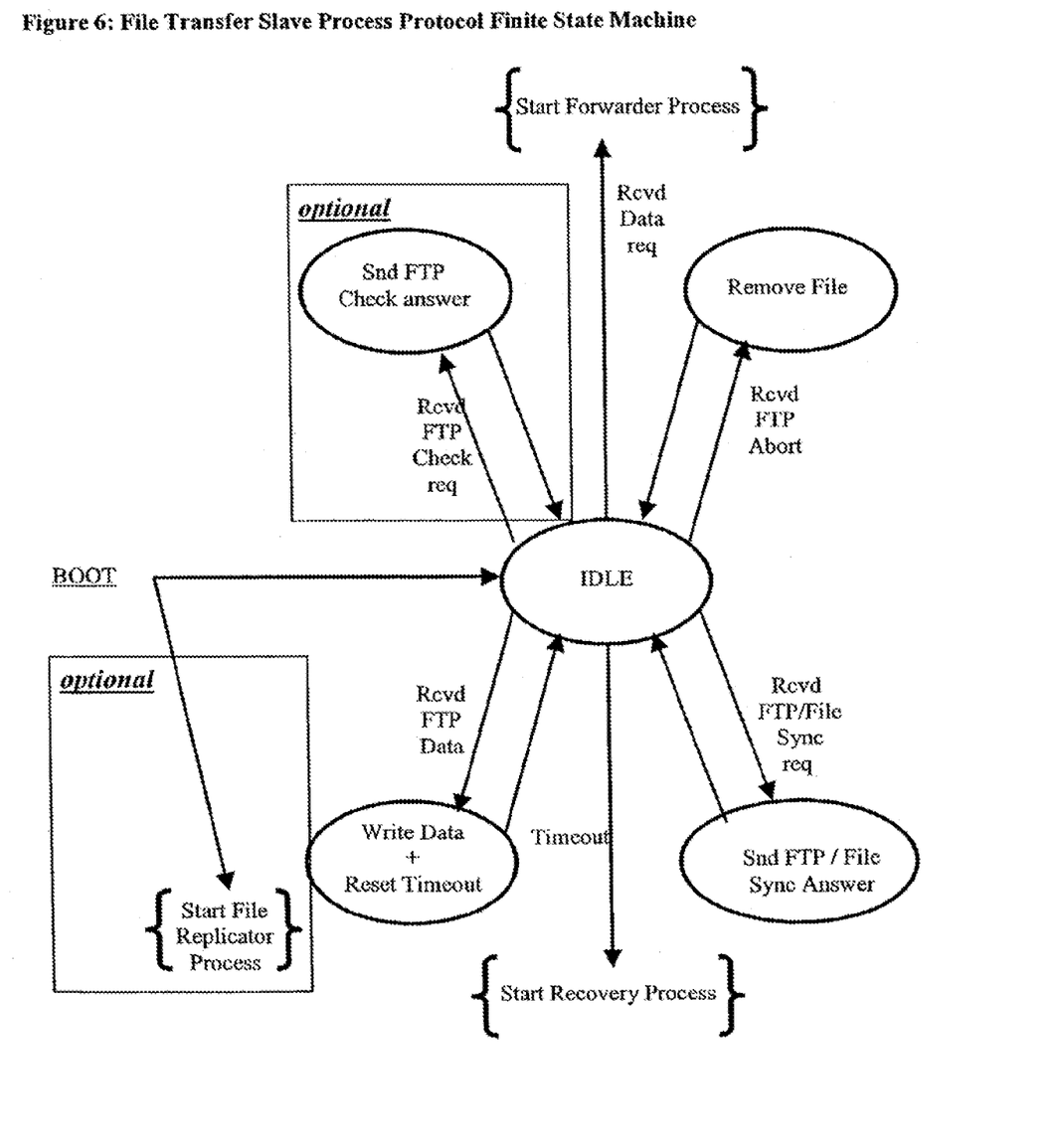
FIG. 6 illustrates the file transfer slave process protocol finite state machine.
Figure 7:
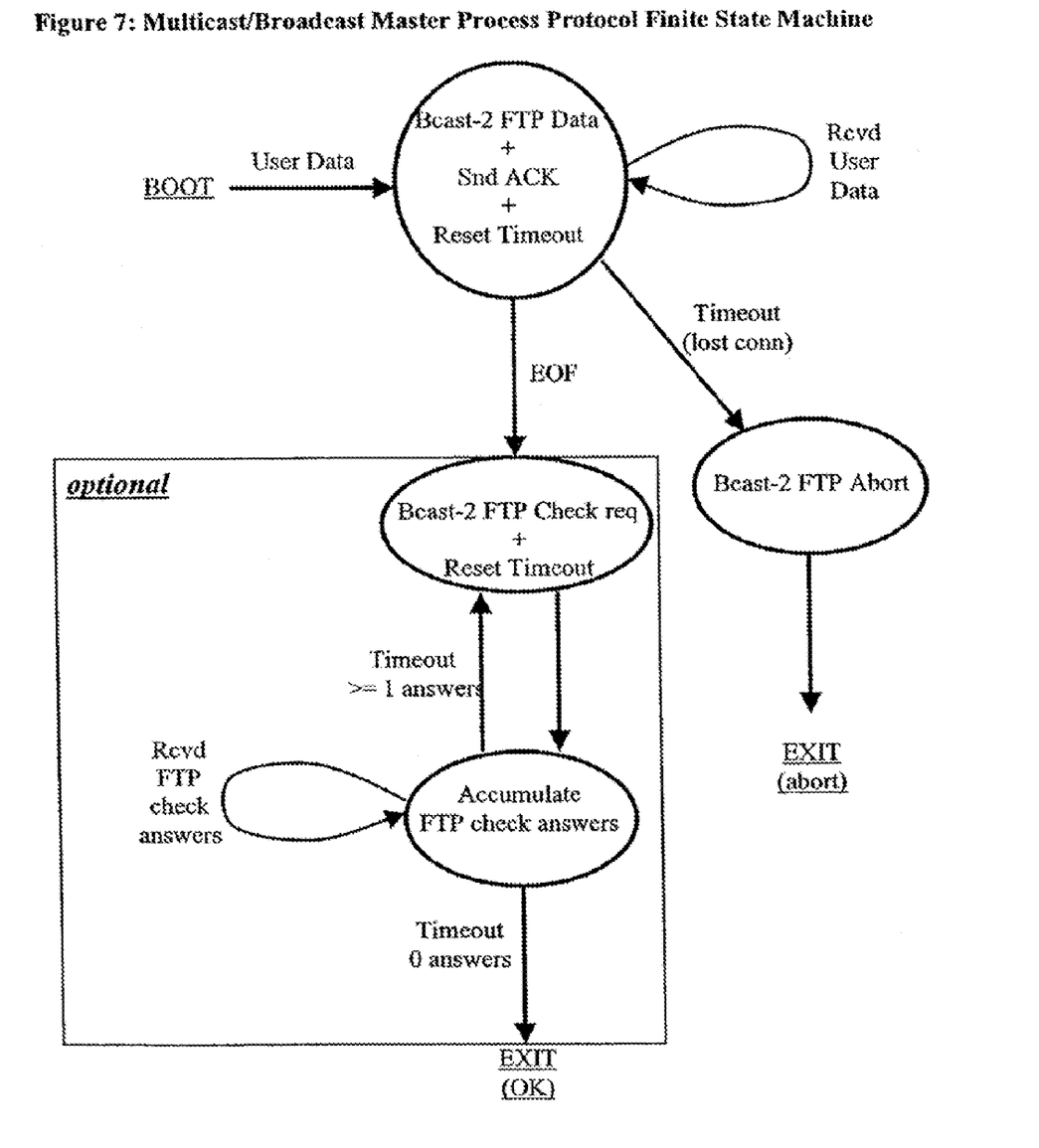
FIG. 7 shows the multicast/broadcast master process protocol finite state machine.

The file transfer slave process protocol finite state machine shown in FIG. 6 implements the multicast file transfer reception side, the transfer error recovery mechanism and further contains two optional protocol extensions for file transfer completion and file replication. Single message exchange requests, such as completion check, transfer abort request, file replication or error recovery selection requests and reception of file fragments are handled directly by the slave process. All other tasks, such as assisting another slave to recover file fragments, or initiating a recovery procedure or file replication upon boot are handled in individual sub-processes. Consequently, a single file transfer slave process can handle multiple simultaneous file transfers and file transfer recovery procedures or can assist concurrently more than one slave process to recover missing or corrupted file fragments. The optional protocol extensions are file completion check and file replication procedure.

Figure 8:
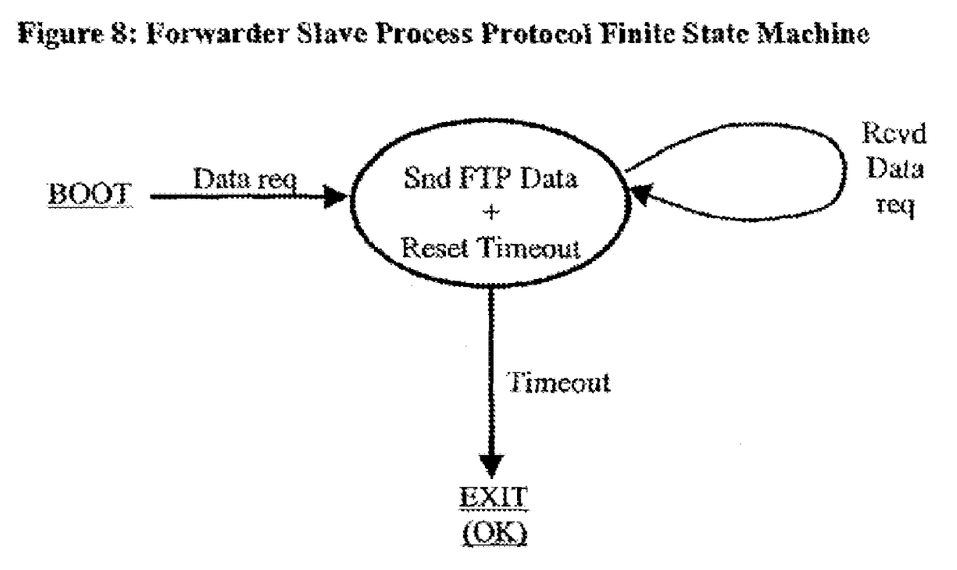
FIG. 8 depicts the forwarder slave process protocol finite state machine.

The file transfer forwarding process, FIG. 8, consists in forwarding requested file fragments to the originating file transfer slave process until no further requests are received during a preset period of time.

Figure 9:
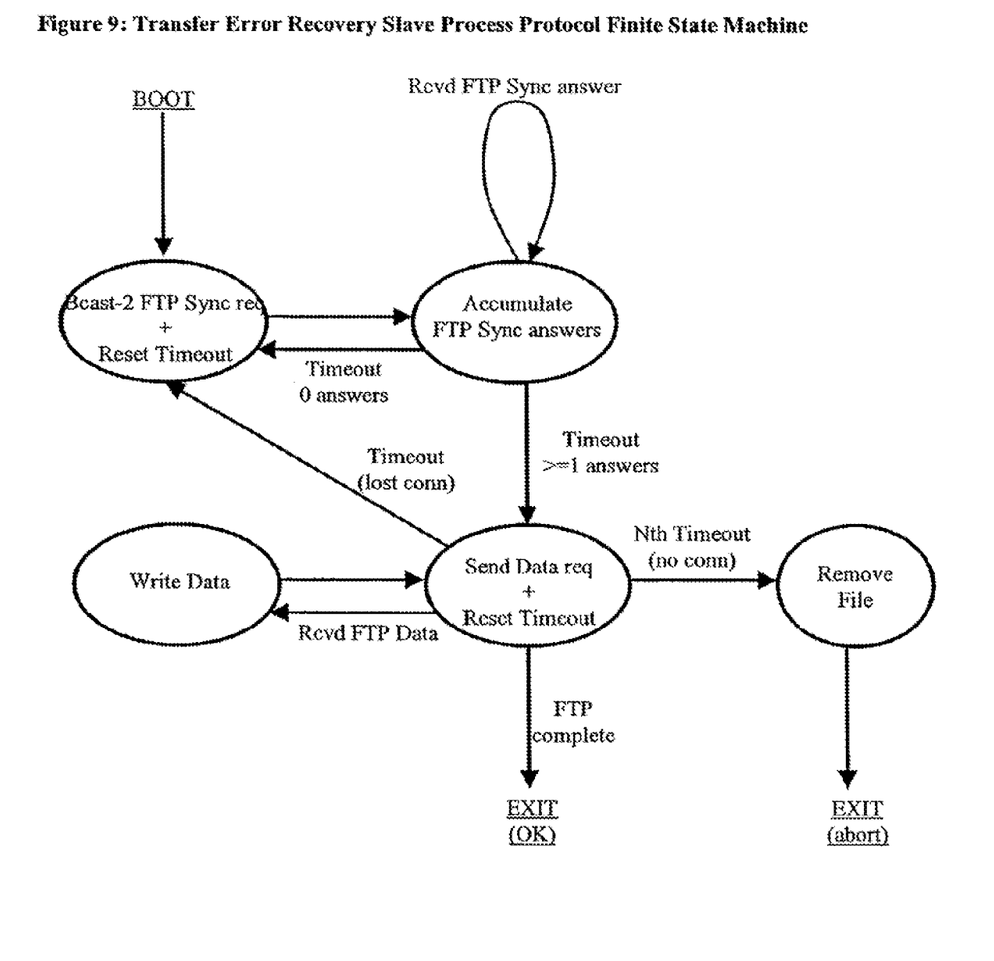
FIG. 9 shows the transfer error recovery slave process protocol finite state machine.

FIG. 9 shows the file transfer recovery process protocol finite state machine. After an initial selection phase, to locate a cooperating file transfer slave process, requests to forward missing (or corrupted) file fragments are sent out to the selected slave process. Cooperating processes respond to a forwarding request only if they possess a proper copy or the file fragment requested. If no cooperating slave process can be selected (i.e. no other slave process contains the requested file fragment) the incomplete file is removed and the recovery terminates. Forwarded file fragments, once received, are written in their correct location in the target file.

Figure 10:
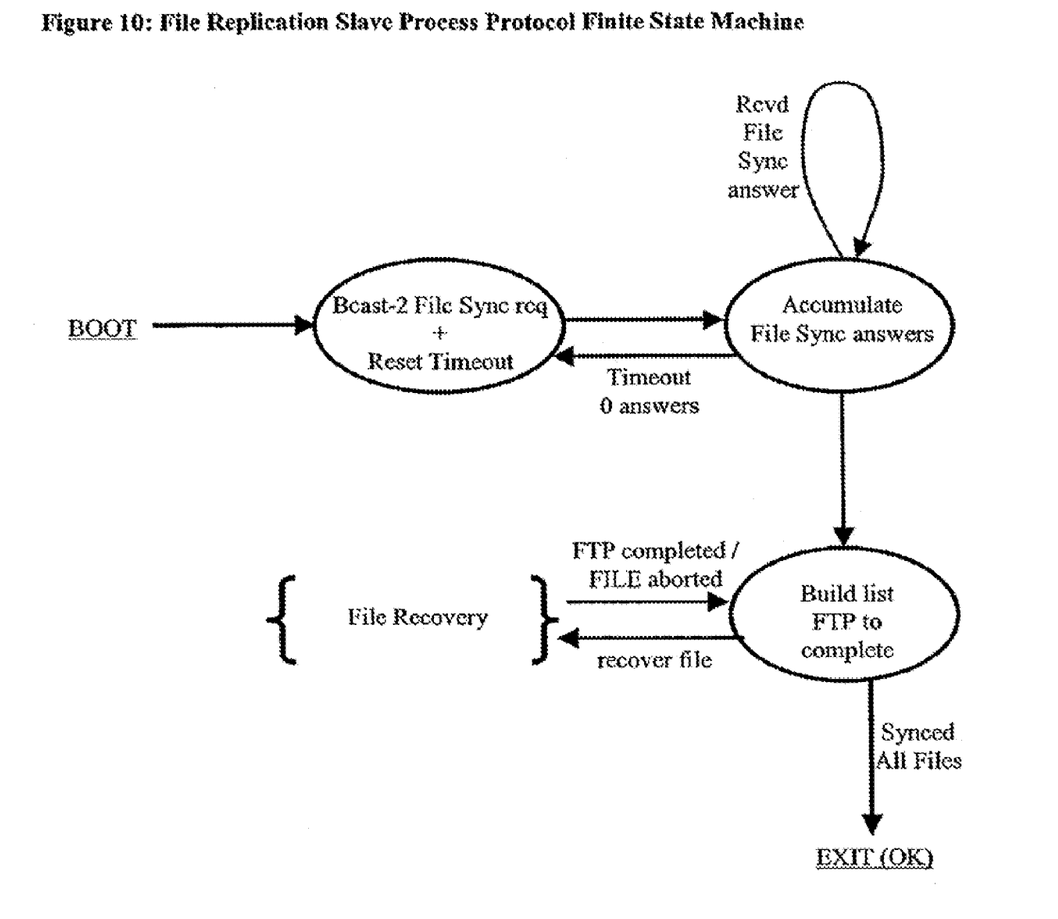
FIG. 10 illustrates the file replication slave process protocol finite state machine.

The overall multicast file transfer and recovery mechanism described so far can be further extended to perform automatic file replication as depicted in FIG. 10 (file replication process protocol finite state machine). Upon startup a file transfer slave process can spawn a sub-process to perform asynchronously the file replication procedure. File replication serves two purposes: complete upon boot interrupted file transfers and perform file transfers that have occurred while the file transfer slave process was non operational. The protocol starts by initiating a selection procedure to locate a cooperating file transfer slave process. This cooperating process serves the purpose to determine which file transfers occurred while the requesting slave process was non operational. Afterwards each file transfer missed, or interrupted (these can be determined locally from the file fragments stored) is completed using the normal file recovery protocol engine (either in an independent sub-process or not, depending on the implementation).

The combination of persistent connectionless requests and distributed selection procedure allows for scalability and fault-tolerance since there is no need for global state knowledge to be maintained by a centralized entity (or replicated entities). Furthermore it allows to build a light weight protocol which can be implemented efficiently even on appliance type devices. The use of multicast (or broadcast) minimizes network utilization, allowing higher aggregate file transfer rates and enabling the use of lesser expensive networking equipment (which in turn allows the use of lesser expensive nodes). The separation of multicast file transfer and recovery file transfer phases allows the deployment of a distributed file recovery mechanism that further enhances scalability and fault-tolerance properties. Finally, the independent file transfer recovery mechanism can be used to implement an asynchronous file replication apparatus, where newly introduced nodes (or rebooted nodes) can perform file transfers which occurred while they were non operational and after the completion of the multicast file transfer phase.

In its preferred embodiment, the present invention is applied to file transfer and file replication. The one skilled in the art will however recognize that the present invention can be applied to the transfer, replication and/or streaming of any type of data.

What is claimed is:

1. A method for completing an interrupted data replication operation, the method comprising:
   commencing a data replication operation amongst a plurality of networked computing devices;
   identifying an interruption of the data replication operation at one of the computing devices from the plurality of networked computing devices; and
   receiving data transferred as a part of the data replication operation subsequent to the interruption of the data replication operation at the one of the computing devices from any of the other plurality of networked computing devices, wherein the data received subsequent to the interruption of the data replication operation is transferred using a connectionless transfer protocol, the transfer being asynchronous and autonomous relative to the data replication operation.

2. The method of claim 1, wherein the data transferred as a part of the data replication operation subsequent to the interruption of the data replication operation at the one of the computing devices includes data corrupted by the interruption of the data replication operation.

3. The method of claim 1, wherein the data transferred as a part of the data replication operation subsequent to the interruption of the data replication operation at the one of the computing devices includes data never initially received as a result of the interruption of the data replication operation.

4. The method of claim 1, wherein the data includes a complete file.

5. The method of claim 1, wherein the data includes a portion of a complete file.

6. The method of claim 1, wherein the data includes a series of packets.

7. The method of claim 1, wherein the data received subsequent to the interruption of the data replication operation is received from a single computing device from the plurality of other networked computing devices.

8. The method of claim 1, wherein the data received subsequent to the interruption of the data replication operation is received from multiple computing devices from the plurality of other networked computing devices.

9. The method of claim 1, further comprising removing data from the one of the computing devices, wherein the data is removed as a part of the asynchronous and autonomous transfer of data.

10. The method of claim 9, wherein the removed data is expired data.

11. The method of claim 9, wherein the removed data is data originally transferred as a part of the data replication operation and having been modified subsequent to the interruption of the data replication operation.

12. The method of claim 1, further comprising identifying data to be updated subsequent to the interruption of the data replication operation.

13. The method of claim 12, wherein data is identified using a log of deltas.

14. The method of claim 12, further comprising updating data at the one of the computing devices subsequent to the interruption of the data replication operation, wherein the data updated is data identified as to be updated.

15. The method of claim 1, wherein the data replication operation includes a plurality of operations.

16. The method of claim 1, wherein the plurality of networked computing devices are a part of a peer-to-peer network.

17. The method of claim 1, wherein the asynchronous and autonomous transfer of data may be controlled to prevent network saturation.

18. A computing device, comprising:
- a processor; and
- memory storing a program, the program being executable by the processor for performing a method for completing an interrupted data replication operation, the method comprising:
  - commencing a data replication operation with a plurality of other computing devices in a network;
  - identifying an interruption of the data replication operation; and
  - receiving data transferred as a part of the data replication operation subsequent to the interruption of the data replication operation from any of the plurality of other networked computing devices, wherein the data received subsequent to the interruption of the data replication operation is transferred using a connectionless transfer protocol, the transfer being asynchronous and autonomous relative to the data replication operation.

19. A computer-readable storage medium having embodied thereon a program, the program being executable by a processor to perform a method for completing an interrupted data replication operation, the method comprising:
- commencing a data replication operation with a plurality of other computing devices in a network;
- identifying an interruption of the data replication operation; and
- receiving data transferred as a part of the data replication operation subsequent to the interruption of the data replication operation from any of the plurality of other networked computing devices, wherein the data received subsequent to the interruption of the data replication operation is transferred using a connectionless transfer protocol, the transfer being asynchronous and autonomous relative to the data replication operation.

* * * * *